(12) United States Patent
Ilincic et al.

(10) Patent No.: US 11,823,182 B2
(45) Date of Patent: *Nov. 21, 2023

(54) NFC MOBILE CURRENCY TRANSFER

(71) Applicant: Capital One Services, LLC, McLean, VA (US)

(72) Inventors: Rajko Ilincic, Annandale, VA (US); Jeffrey Rule, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 31 days.

This patent is subject to a terminal disclaimer.

(21) Appl. No.: 17/202,954

(22) Filed: Mar. 16, 2021

(65) Prior Publication Data

US 2021/0279724 A1    Sep. 9, 2021

Related U.S. Application Data

(63) Continuation of application No. 16/359,971, filed on Mar. 20, 2019, now Pat. No. 10,984,416.

(51) Int. Cl.
*G06Q 20/38* (2012.01)
*G06Q 20/34* (2012.01)
*G06Q 20/40* (2012.01)

(52) U.S. Cl.
CPC ....... *G06Q 20/3829* (2013.01); *G06Q 20/352* (2013.01); *G06Q 20/40* (2013.01); *G06Q 2220/00* (2013.01)

(58) Field of Classification Search
CPC .. G06Q 20/3829; G06Q 20/352; G06Q 20/40; G06Q 2220/00
See application file for complete search history.

(56) References Cited

U.S. PATENT DOCUMENTS

| | | | |
|---|---|---|---|
| 10,366,378 B1* | 7/2019 | Han | G06Q 20/204 |
| 2012/0011070 A1* | 1/2012 | Ward | G06Q 20/34 |
| | | | 705/72 |
| 2016/0217442 A1* | 7/2016 | Auer | G06Q 20/22 |
| 2017/0148018 A1* | 5/2017 | Levin | G06Q 20/202 |
| 2017/0161730 A1* | 6/2017 | Hattar | G07F 19/203 |
| 2017/0221047 A1* | 8/2017 | Veerasangappa Kadi | |
| | | | G06Q 20/3829 |
| 2017/0272253 A1* | 9/2017 | Lavender | H04L 63/12 |
| 2019/0188705 A1* | 6/2019 | Ecker | G06Q 20/40 |

OTHER PUBLICATIONS

Veronique Cortier, et al., Designing and Proving an EMV-Compliant Payment Protocol for Mobile Devices, Jul. 3, 2017, IEEE, pp. 467-480 (Year: 2017).*

* cited by examiner

*Primary Examiner* — Nilesh B Khatri
(74) *Attorney, Agent, or Firm* — KDW FIRM PLLC

(57) ABSTRACT

Various embodiments are generally directed to NFC-based mobile currency transfers. A mobile payment may be programmatically initialized when at least two mobile devices come into NFC communications range. A payment card associated with an account used to fund the currency transfer may be tapped to one or more of the devices to allow a server to validate the currency transfer.

20 Claims, 10 Drawing Sheets

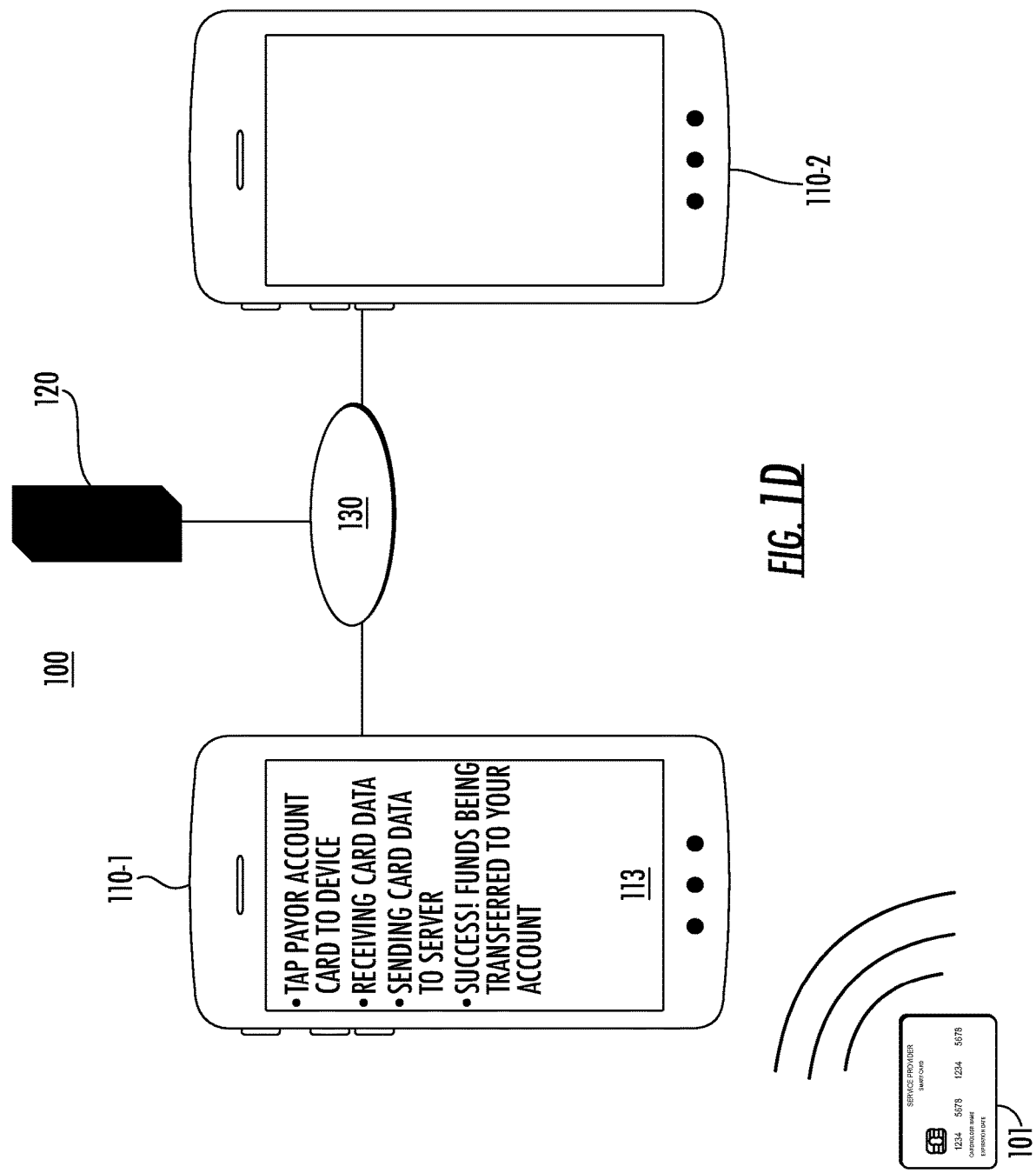

NFC MOBILE CURRENCY TRANSFER

CROSS-REFERENCE TO RELATED APPLICATIONS

This application is a continuation of U.S. patent application Ser. No. 16/359,971, entitled "NFC MOBILE CURRENCY TRANSFER" filed on Mar. 20, 2019. The contents of the aforementioned application are incorporated herein by reference in their entirety.

TECHNICAL FIELD

Embodiments herein generally relate to mobile computing platforms, and more specifically, to near-field communication (NFC) mobile currency transfers.

BACKGROUND

Sending funds from one account to another account is often a challenging process which may have security vulnerabilities and require an Internet connection. For example, without appropriate security measures, malicious users may read account data from a contactless card and process a payment from the account without the knowledge of the account holder. Furthermore, the amount of information required to process the transfer often causes users to make mistakes entering the information into their devices, which can lead to the undesired result of transferring funds to the incorrect account, or funding a transaction using an incorrect account.

SUMMARY

Embodiments disclosed herein provide systems, methods, articles of manufacture, and computer-readable media for NFC mobile currency transfers. For example, a server may receive encrypted data from an application executing on a first device, the encrypted data received by the first device from a communication interface of a contactless card associated with a first account. The server may then decrypt the encrypted data using one or more cryptographic algorithms and a diversified key to yield a customer identification value to verify the encrypted data, the diversified key generated based on a master key and a counter value, the master key and the counter value stored in a memory of the server and stored in a memory of the contactless card. The server may receive, from the application executing on the first device, an encrypted request to transfer funds from the first account to a second account, the encrypted request generated responsive to the first device coming into communications range with a second device associated with the second account. The server may then decrypt the encrypted request to transfer funds from the first account to the second account, and authorize the request to transfer funds from the first account to the second account.

BRIEF DESCRIPTION OF THE DRAWINGS

FIGS. 1A-1D illustrate embodiments of NFC mobile currency transfer.

DETAILED DESCRIPTION

Figure 1A:
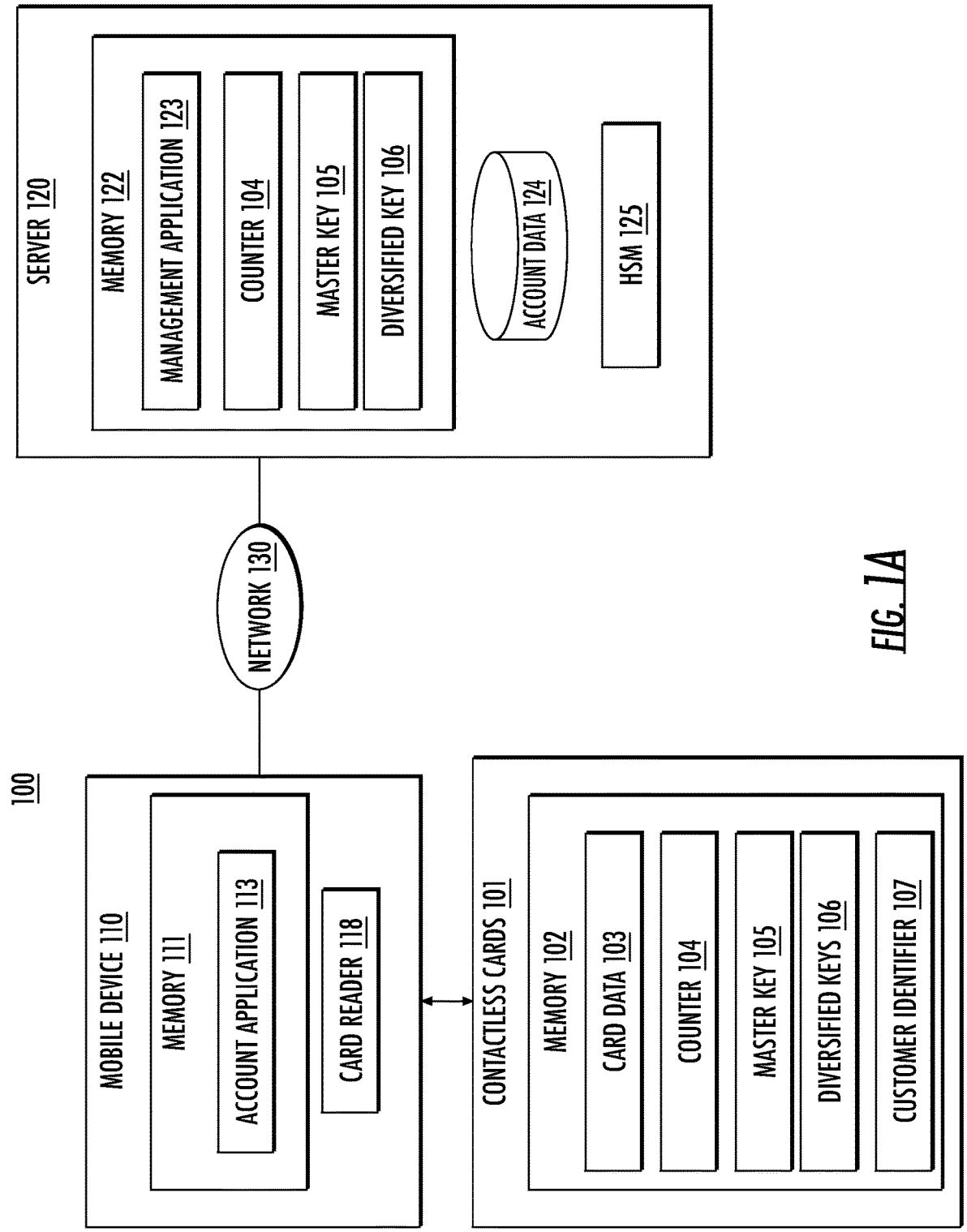

Embodiments disclosed herein provide secure techniques for mobile currency transfer using NFC-enabled mobile devices. In one embodiment, a first user may use an application executing on a first mobile device to initiate a request to receive payment from a second user. When the first mobile device of the first user is within NFC communications range with a second mobile device of the second user, an application executing on the second mobile device may receive data describing the payment request (e.g., account information, payment amount, etc.) from the application executing on the first mobile device. The second user may then approve the request, which may cause the second mobile device to transmit an indication to a server to process the payment.

In some embodiments, the server may need to verify additional data to authorize and process the payment. For example, the additional data may be stored in a contactless card associated with the payment account (e.g., the account of the second user). In such an example, the second user may tap the contactless card to the second mobile device. Doing so instructs the contactless card to generate encrypted data and transmit the encrypted data to the second mobile device. The second mobile device may then transmit the encrypted data to the server, which may verify the encrypted data. Generally, the contactless card and server may use key diversification to encrypt and/or decrypt data for verification, described in greater detail below. If the server is able to verify the encrypted data generated by the contactless card, the server may authorize and process the payment.

Furthermore, in at least one embodiment, the contactless card may be tapped to the first mobile device. Doing so instructs the contactless card to transmit the encrypted data to the first mobile device. In at least one embodiment, the contactless card generates new encrypted data prior to transmitting the encrypted data to the first mobile device. The first mobile device may then pass the encrypted data to the server. If the server receives the encrypted data from the first mobile device within a predefined amount of time (e.g., 30 seconds from the receipt of the encrypted data from the second mobile device), the server may authorize and process the payment. Doing so provides enhanced security for the involved devices and the overall financial transaction.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more mobile devices 110, and a server 120. The contactless cards 101 are representative of any type of payment card, such as a credit card, debit card, ATM card, gift card, and the like. The contactless cards 101 may comprise one or more chips (not depicted), such as a radio frequency identification (RFID) chip, configured to communicate with the mobile devices 110 via NFC, the EMV standard, or other short-range protocols in wireless communication, or using NFC Data Exchange Format (NDEF) tags. Although NFC is used as an example communications protocol, the disclosure is equally applicable to other types of wireless communications, such as the EMV standard, Bluetooth, and/or Wi-Fi. The mobile devices 110 are representative of any type of network-enabled computing devices, such as smartphones, tablet computers, wearable devices, laptops, portable gaming devices, and the like. The server 120 is representative of any type of computing device, such as a server, workstation, compute cluster, cloud computing platform, virtualized computing system, and the like.

As shown, a memory 102 of the contactless card includes card data 103, a counter 104, a master key 105, a diversified key 106, and a unique customer identifier 107. The card data 103 generally includes account-related information, such as information used to process a payment using the contactless card 101. For example, the card data 103 may comprise an account number, expiration date, and card verification value (CVV). The account number may be any type of account number, such as a primary account number (PAN), a virtual account number, and/or a token generated based on the PAN. Other types of account numbers are contemplated, and the use of the account number or other types of card data 103 should not be considered limiting of the disclosure. The card data 103 may further include a user's first name, last name, addresses, and any other account-related information.

As shown, a memory 111 of the mobile device 110 includes an instance of an account application 113. The account application 113 allows users to perform various account-related operations, such as viewing account balances and processing payments as described in greater detail below. Initially, a user must authenticate using authentication credentials to access the account application. For example, the authentication credentials may include a username and password, biometric credentials, and the like. The mobile device 110 is generally under the control of an operating system (not pictured). Example operating systems include the Android® OS, iOS®, Linux®, and Windows® operating systems.

As shown, the server 120 includes a data store of account data 124 and a memory 122. The account data 124 includes account-related data for a plurality of users and/or accounts. The account data 124 may include at least a master key 105, counter 104, a customer ID 107, an associated contactless card 101, and biographical information for each account. The memory 122 includes a management application 123 and instances of the counter 104, master key 105, and diversified key 106.

Generally, the system 100 is configured to implement key diversification to secure data and transactions made using the contactless cards 101. Generally, the server 120 (or another computing device) and the contactless card 101 may be provisioned with the same master key 105 (also referred to as a master symmetric key). More specifically, each contactless card 101 is programmed with a distinct master key 105 that has a corresponding pair in the server 120. For example, when a contactless card 101 is manufactured, a unique master key 105 may be programmed into the memory 102 of the contactless card 101. Similarly, the unique master key 105 may be stored in a record of a customer associated with the contactless card 101 in the account data 124 of the server 120 (and/or stored in a different secure location). The master key may be kept secret from all parties other than the contactless card 101 and server 120, thereby enhancing security of the system 100.

The master keys 105 may be used in conjunction with the counters 104 to enhance security using key diversification. The counters 104 comprise values that are synchronized between the contactless card 101 and server 120. The counter value 104 may comprise a number that changes each time data is exchanged between the contactless card 101 and the server 120 (and/or the contactless card 101 and the mobile device 110). To enable NFC data transfer between the contactless card 101 and the mobile device 110, the account application 113 may communicate with the contactless card 101 when the contactless card 101 is sufficiently close to a card reader 118 of the mobile device 110. Card reader 118 may be configured to read from and/or communicate with contactless card 101 (e.g., via NFC, Bluetooth, RFID, etc.). Therefore, example card readers 118 include NFC communication modules, Bluetooth communication modules, and/or RFID communication modules.

For example, a user may tap the contactless card 101 to the mobile device 110, thereby bringing the contactless card 101 sufficiently close to the card reader 118 of the mobile device 110 to enable NFC data transfer between the contactless card 101 and the card reader 118 of the mobile device 110. After communication has been established between mobile device 110 and contactless card 101, the contactless card 101 generates a message authentication code (MAC) cryptogram. In some examples, this may occur when the contactless card 101 is read by the account application 113. In particular, this may occur upon a read, such as an NFC read, of a near field data exchange (NDEF) tag, which may be created in accordance with the NFC Data Exchange Format. For example, a reader, such as the account application 113 and/or the card reader 118, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, the counter value 104 maintained by the contactless card 101 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message). In some examples, the MAC cryptogram may be transmitted as an NDEF tag, and in other examples the MAC cryptogram may be included with a uniform resource indicator (e.g., as a formatted string). The contactless card 101 may then transmit the MAC cryptogram to the mobile device 110, which may then forward the MAC cryptogram to the server 120 for verification as explained below. However, in some embodiments, the mobile device 110 may verify the MAC cryptogram.

More generally, when preparing to send data (e.g., to the server 120 and/or the mobile device 110), the contactless card 101 may increment the counter value 104. The contactless card 101 may then provide the master key 105 and counter value 104 as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. The contactless card 101 may then encrypt the data (e.g., the customer identifier 107 and any other data) using the diversified key 106. The contactless card 101 may then transmit the encrypted data to the account application 113 of the mobile device 110 (e.g., via an NFC connection, Bluetooth connection, etc.). The account application 113 of the mobile device 110 may then transmit the encrypted data to the server 120 via the network 130. In at least one embodiment, the contactless card 101 transmits the counter value 104 with the encrypted data. In such embodiments, the contactless card 101 may transmit an encrypted counter value 104, or an unencrypted counter value 104.

Upon receiving the data, the management application 123 of the server 120 may perform the same symmetric encryption using the counter value 104 as input to the encryption, and the master key 105 as the key for the encryption. As stated, the counter value 104 may be specified in the data received from the mobile device 110, or a counter value 104 maintained by the server 120 to implement key diversification for the contactless card 101. The output of the encryption may be the same diversified key value 106 that was created by the contactless card 101. The management application 123 may then decrypt the encrypted data received via the network 130 using the diversified key 106, which reveals the data transmitted by the contactless card 101 (e.g., at least the customer identifier 107). Doing so allows the management application 123 to verify the data transmitted by the contactless card 101 via the mobile device 110 and ensure that a user of the account application 113 on the mobile device 110 is proximate to the contactless card 101. More specifically, the management application 123 may verify the data transmitted by the contactless card 101 via the mobile device 110 by comparing the decrypted customer ID 107 to a customer ID in the account data 124 for the account, where a match of the customer ID values verifies the data received from the contactless card 101.

Although the counter 104 is used as an example, other data may be used to secure communications between the contactless card 101, the mobile device 110, and/or the server 120. For example, the counter 104 may be replaced with a random nonce, generated each time a new diversified key 106 is needed, the full value of a counter value sent from the contactless card 101 and the server 120, a portion of a counter value sent from the contactless card 101 and the server 120, a counter independently maintained by the contactless card 101 and the server 120 but not sent between the two, a one-time-passcode exchanged between the contactless card 101 and the server 120, and a cryptographic hash of data. In some examples, one or more portions of the diversified key 106 may be used by the parties to create multiple diversified keys 106.

As shown, the server 120 may include one or more hardware security modules (HSM) 125. For example, one or more HSMs 125 may be configured to perform one or more cryptographic operations as disclosed herein. In some examples, one or more HSMs 125 may be configured as special purpose security devices that are configured to perform the one or more cryptographic operations. The HSMs 125 may be configured such that keys are never revealed outside the HSM 125, and instead are maintained within the HSM 125. For example, one or more HSMs 125 may be configured to perform at least one of key derivations, decryption, and MAC operations. The one or more HSMs 125 may be contained within, or may be in data communication with, server 120.

Figure 1B:
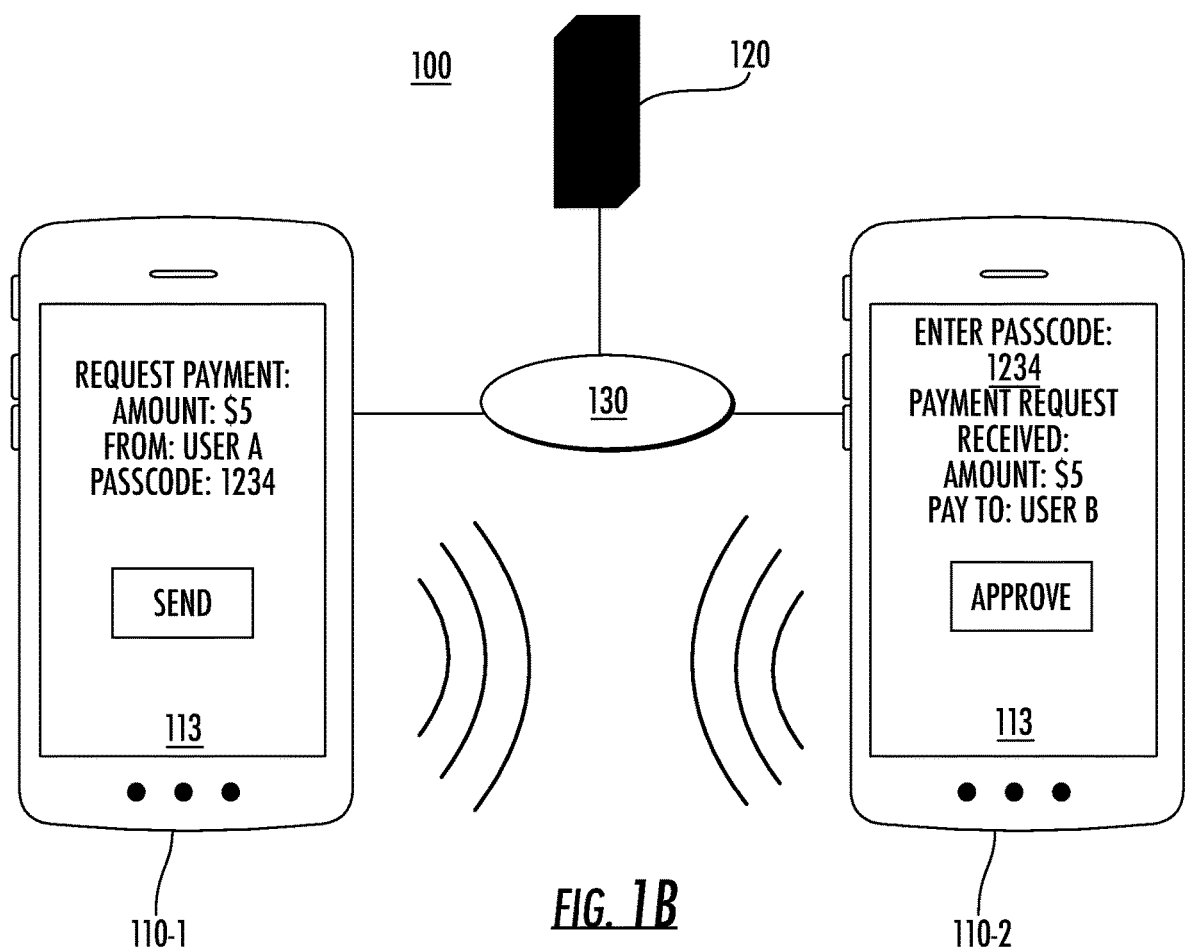

As stated, the key diversification technique may be used to perform secure operations using the contactless card 101. For example, authenticated users may use the account application 113 to perform NFC-based currency transfers. FIG. 1B depicts an example where a mobile device 110-1 and 110-2 initiate an NFC-based currency transfer. As shown, the mobile devices 110-1, 110-2 execute instances of the account application 113. The user of mobile device 110-1 has specified to request a payment of $5 from "User A", where User A corresponds to the user of mobile device 110-2. Furthermore, as shown, the user of mobile device 110-1 has specified an additional passcode value of "1234" which may be used to secure data sent between the devices 110-1, 110-2. The users may share the passcode (e.g., verbally or in writing). However, in some embodiments, the passcode is not specified and the additional security mechanisms are not implemented.

When the mobile devices 110-1, 110-2 enter in NFC communications range, the account application 113 of mobile device 110-1 may generate and transmit an indication of the requested payment to the mobile device 110-2 via the NFC card reader 118. The indication may include at least a receiving account number (e.g., an account number of the user of mobile device 110-1) and the requested amount. When received by the mobile device 110-2, the account application 113 may prompt the user to enter the passcode. As shown, the user enters the correct passcode, and the account application 113 outputs a graphical user interface (GUI) with the details of the requested payment (e.g., the amount and recipient "User B"). Although "User B" is depicted as the recipient, in some embodiments, an account number may additionally and/or alternatively be used to identify the recipient. Once the user of mobile device 110-2 approves the transaction, the account application 113 of mobile device 110-2 may transmit an indication of the approved transaction to the server 120, which may process the payment accordingly.

Figure 1C:
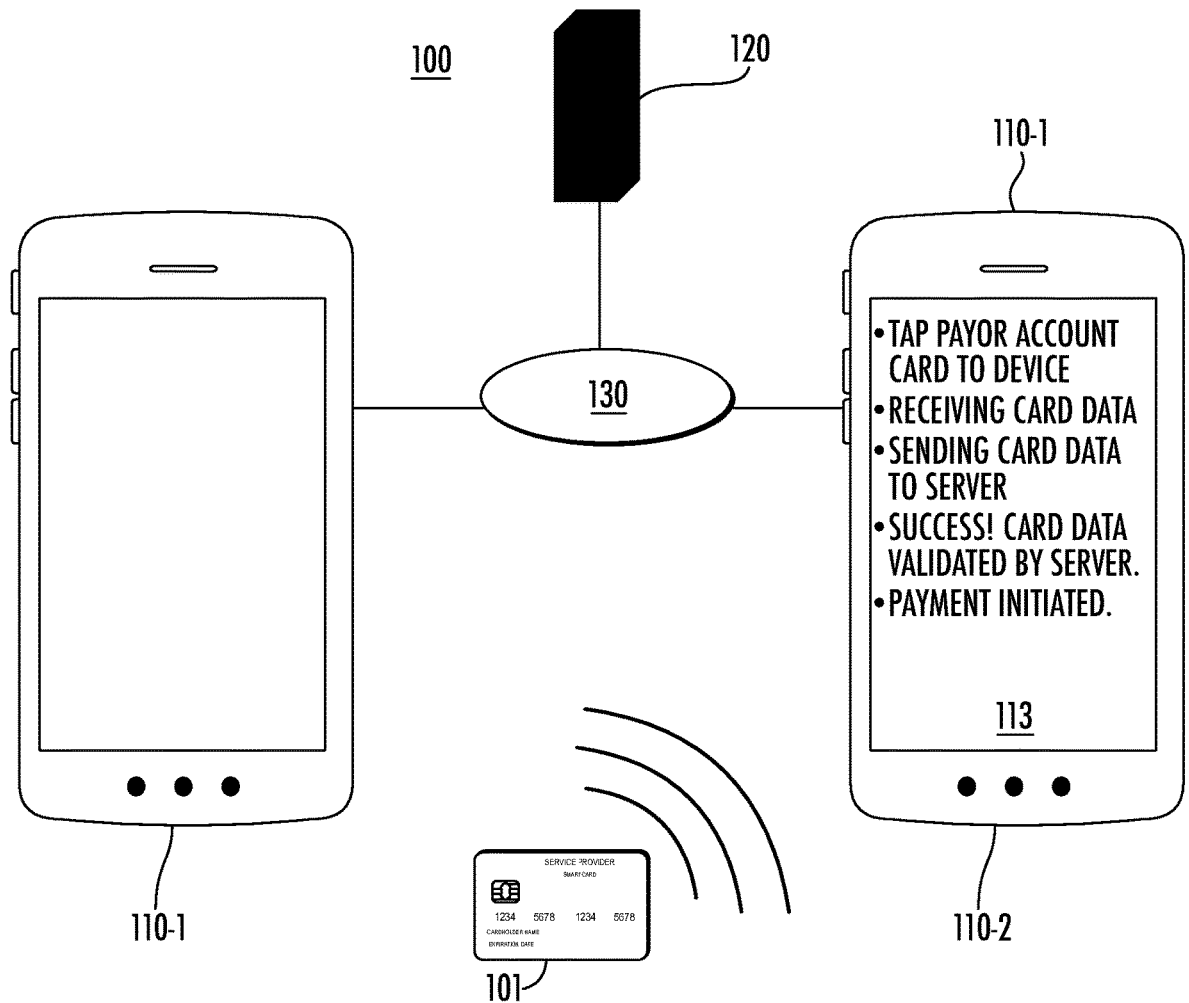

FIG. 1C depicts an embodiment where additional verification is required to process the transaction requested by the user of mobile device 110-1 in FIG. 1B. In such an embodiment, as shown, a contactless card 101 is tapped to mobile device 110-2. The contactless card 101 may belong to the user of mobile device 110-2 (e.g., the payor's contactless card). In response, the contactless card 101 follows the encryption procedure detailed above with reference to FIG. 1A (e.g., using the master key 105, counter 104, and diversified key 106) to generate encrypted data comprising the customer identifier 107. The contactless card 101 may transmit the generated encrypted data to the mobile device 110-2, which receives the encrypted data via the NFC card reader 118. Once received, the account application 113 of the mobile device 110-2 transmits the encrypted data to the server 120, which verifies the encrypted data as described above (e.g., using the master key 105, counter 104, and diversified key 106). Upon decrypting the data received from the mobile device 110-2, the server 120 may compare the customer identifier 107 to an expected customer identifier value (e.g., a customer identifier provided by the account application 113, a customer identifier stored in the account data 124, etc.). Upon verifying the presence of the contactless card 101 associated with the payor's account, the server 120 may approve and process the payment, and transmit an indication of the same to the mobile devices 110-1 and/or 110-2.

In one embodiment, the account application 113 transmits the encrypted data received from the contactless card 101 contemporaneously with the request to process the transaction. In other embodiments, the account application 113 transmits the encrypted data received from the contactless card 101 prior to transmitting a request to process the transaction. In other embodiments, e.g., the embodiment depicted in FIG. 1C, the account application 113 transmits the encrypted data received from the contactless card 101 subsequent to transmitting a request to process the transaction. Furthermore, any of the mobile devices 110-1, 110-2 may initiate the transfer request. For example, the user of mobile device 110-2 may specify to pay the user of mobile device 110-1, and the "tap" of the mobile devices when in NFC communications range provides the account application 113 of mobile device 110-2 with the account information of the user of mobile device 110-1 necessary to submit, approve, and process the transaction.

FIG. 1D depicts an embodiment where additional verification is required to process the transaction requested by the user of mobile device 110-1 in FIG. 1B. In some embodiments, the operations performed in FIG. 1D are in addition to the operations performed in FIGS. 1B and 1C. In other embodiments, the operations performed in FIG. 1D are in addition to the operations performed in FIG. 1B. For the purpose of illustration, and not limitation, FIG. 1D is discussed with respect to embodiments where the operations performed in FIG. 1D are in addition to the operations performed in FIGS. 1B and 1C.

In such an embodiment, as shown, the contactless card 101 is tapped to mobile device 110-1. The contactless card 101 may belong to the user of mobile device 110-2 (e.g., the payor's contactless card). In response, the contactless card 101 follows the encryption procedure detailed above (e.g., using the master key 105, counter 104, and diversified key 106) to generate an encrypted data comprising the customer identifier 107, which is then sent to the mobile device 110-1 via NFC. However, in one embodiment, the contactless card 101 re-transmits the encrypted data transmitted in FIG. 1C. Once received, the account application 113 of the mobile device 110-1 transmits the encrypted data to the server 120, which verifies the encrypted data as described above (e.g., using the master key 105, counter 104, and diversified key 106). The server 120 may generally compare the decrypted customer identifier 107 to an expected customer identifier value (e.g., the customer identifier 107 received in from device 110-2 in FIG. 1C, etc.) to approve the transaction. Furthermore, in at least one embodiment, upon receiving the data from the mobile device 110-1, the server 120 may determine whether an amount of time that has elapsed since the data received from device 110-2 in FIG. 2B exceeds a threshold amount of time (e.g., 30 seconds). Doing so allows the server 120 to ensure that both users are in proximity of each other and the contactless card 101. The server 120 may then approve and process the payment, and transmit an indication of the same to the mobile devices 110-1 and/or 110-2.

Figure 2A:
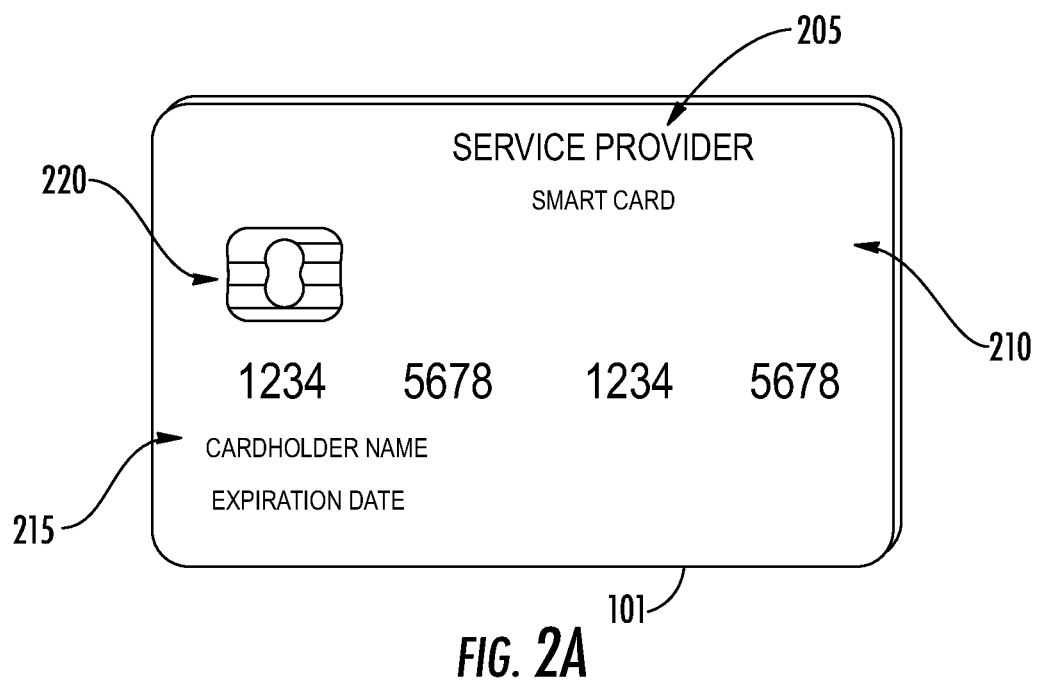
FIGS. 2A-2B illustrate an example contactless card.

FIG. 2A illustrates a contactless card 101, which may comprise a payment card, such as a credit card, debit card, and/or a gift card. As shown, the contactless card 101 may be issued by a service provider 205 displayed on the front or back of the card 101. In some examples, the contactless card 101 is not related to a payment card, and may comprise, without limitation, an identification card. In some examples, the payment card may comprise a dual interface contactless payment card. The contactless card 101 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 215 displayed on the front and/or back of the card, and a contact pad 220. The contact pad 220 may be configured to establish contact with another communication device, such as a user device, smart phone, laptop, desktop, or tablet computer. The contactless card 101 may also include processing circuitry, antenna and other components not shown in FIG. 2A. These components may be located behind the contact pad 220 or elsewhere on the substrate 210. The contactless card 101 may also include a magnetic strip or tape, which may be located on the back of the card (not shown in FIG. 2A).

Figure 2B:
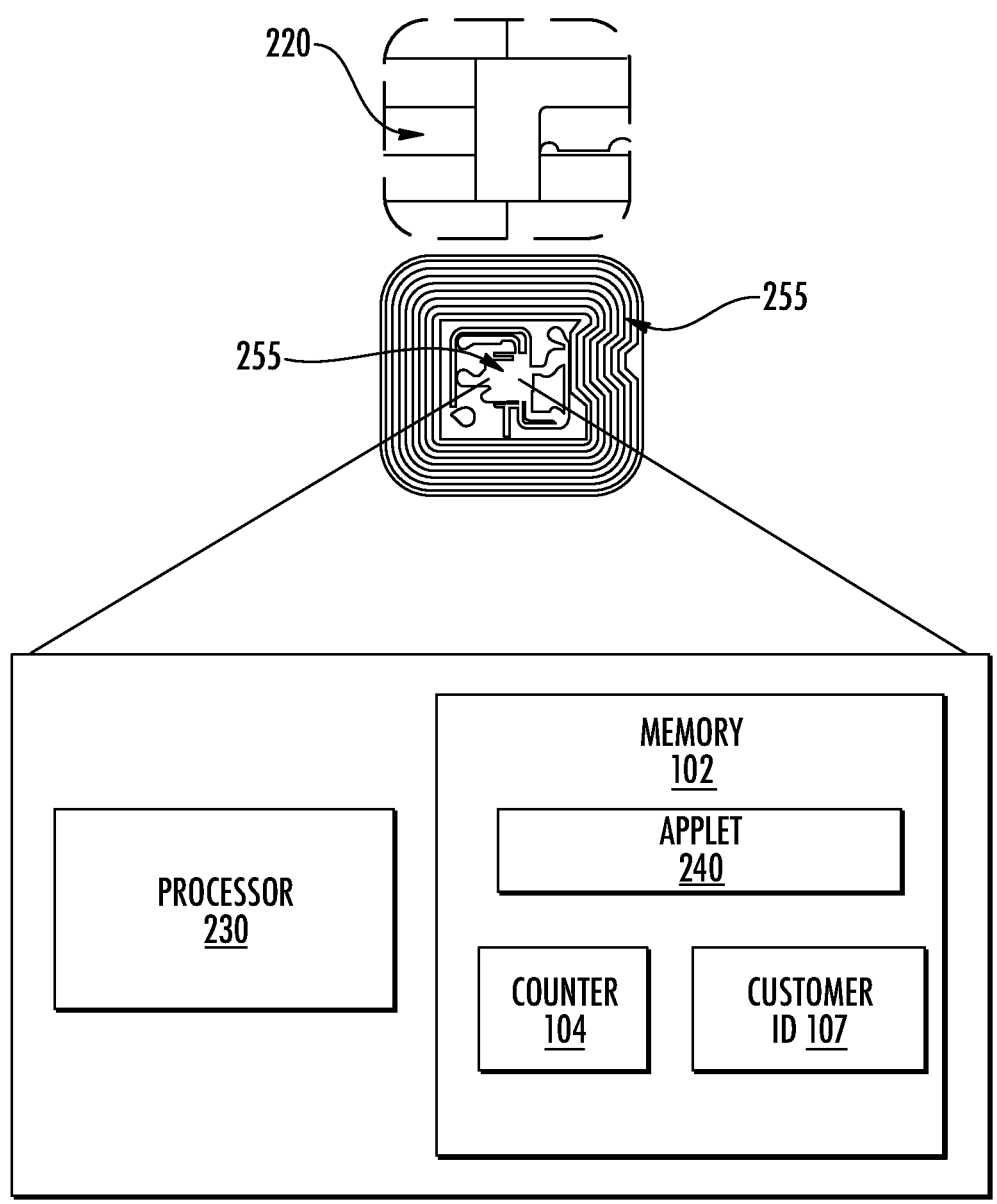

As illustrated in FIG. 2B, the contact pad 220 of FIG. 2A may include processing circuitry 225 for storing and processing information, including a microprocessor 230 and a memory 102. It is understood that the processing circuitry 225 may contain additional components, including processors, memories, error and parity/CRC checkers, data encoders, anticollision algorithms, controllers, command decoders, security primitives and tamperproofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 102 may be configured to store one or more applets 240, one or more counters 104, and a customer identifier 107. The one or more applets 240 may comprise one or more software applications configured to execute on one or more contactless cards, such as a Java® Card applet. However, it is understood that applets 240 are not limited to Java Card applets, and instead may be any software application operable on contactless cards or other devices having limited memory. The one or more counters 104 may comprise a numeric counter sufficient to store an integer. The customer identifier 107 may comprise a unique alphanumeric identifier assigned to a user of the contactless card 101, and the identifier may distinguish the user of the contactless card from other contactless card users. In some examples, the customer identifier 107 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 220 or entirely separate from it, or as further elements in addition to processor 230 and memory 102 elements located within the contact pad 220.

In some examples, the contactless card 101 may comprise one or more antennas 255. The one or more antennas 255 may be placed within the contactless card 101 and around the processing circuitry 225 of the contact pad 220. For example, the one or more antennas 255 may be integral with the processing circuitry 225 and the one or more antennas 255 may be used with an external booster coil. As another example, the one or more antennas 255 may be external to the contact pad 220 and the processing circuitry 225.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 255, processing circuitry 225, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (e.g., of the mobile device 110), and produce an NDEF message that comprises a cryptographically secure OTP encoded as an NDEF text tag.

One example of an NDEF OTP is an NDEF short-record layout (SR=1). In such an example, one or more applets 240 may be configured to encode the OTP as an NDEF type 4 well known type text tag. In some examples, NDEF messages may comprise one or more records. The applets 240 may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

| Item | Length (bytes) | Encrypted? | Notes |
| --- | --- | --- | --- |
| pUID | 8 | No | |
| AutKey | 16 | Yes | 3DES Key for Deriving MAC session keys |
| AutKCV | 3 | No | Key Check Value |
| DEKKey | 16 | Yes | 3DES Key for deriving Encryption session key |
| DEKKCV | 3 | No | Key Check Value |
| Card Shared Random | 4 bytes | No | 4 Byte True Random number (pre-generated) |
| NTLV | X Bytes | No | TLV data for NDEF message |

In some examples, the one or more applets 240 may be configured to maintain its personalization state to allow personalization only if unlocked and authenticated. Other states may comprise standard states pre-personalization. On entering into a terminated state, the one or more applets 240 may be configured to remove personalization data. In the terminated state, the one or more applets 240 may be configured to stop responding to all application protocol data unit (APDU) requests.

The one or more applets 240 may be configured to maintain an applet version (2 bytes), which may be used in the authentication message. In some examples, this may be interpreted as most significant byte major version, least significant byte minor version. The rules for each of the versions are configured to interpret the authentication message: For example, regarding the major version, this may include that each major version comprise a specific authentication message layout and specific algorithms. For the minor version, this may include no changes to the authentication message or cryptographic algorithms, and changes to static tag content, in addition to bug fixes, security hardening, etc.

In some examples, the one or more applets 240 may be configured to emulate an RFID tag. The RFID tag may include one or more polymorphic tags. In some examples, each time the tag is read, different cryptographic data is presented that may indicate the authenticity of the contactless card. Based on the one or more applications, an NFC read of the tag may be processed, the data may be transmitted to a server, such as the server 120, and the data may be validated at the server.

In some examples, the contactless card 101 and server 120 may include certain data such that the card may be properly identified. The contactless card 101 may comprise one or more unique identifiers (e.g., one or more customer IDs 107). Each time a read operation takes place, the counters 104 may be configured to increment. In some examples, each time data from the contactless card 101 is read (e.g., by a mobile device 110), the counter 104 is transmitted to the server for validation and determines whether the counter values 104 are equal (as part of the validation).

The one or more counters 104 may be configured to prevent a replay attack. For example, if a cryptogram has been obtained and replayed, that cryptogram is immediately rejected if the counter 104 has been read or used or otherwise passed over. If the counter 104 has not been used, it may be replayed. In some examples, the counter that is incremented on the card is different from the counter that is incremented for transactions. The contactless card 101 is unable to determine the application transaction counter 104 is since there is no communication between applets 240 on the contactless card 101. In some examples, the contactless card 101 may comprise a first applet 240-1, which may be a transaction applet, and a second applet 240-2. Each applet may comprise a counter 104.

In some examples, the counter 104 may get out of sync. In some examples, to account for accidental reads that initiate transactions, such as reading at an angle, the counter 104 may increment but the application does not process the counter 104. In some examples, when the mobile device 110 is woken up, NFC may be enabled and the device 110 may be configured to read available tags, but no action is taken responsive to the reads.

To keep the counter 104 in sync, an application, such as a background application, may be executed that would be configured to detect when the mobile device 110 wakes up and synchronize with the server 120 indicating that a read that occurred due to detection to then move the counter 104 forward. In other examples, Hashed One Time Password may be utilized such that a window of mis-synchronization may be accepted. For example, if within a threshold of 10, the counter 104 may be configured to move forward. But if within a different threshold number, for example within 10 or 1000, a request for performing re-synchronization may be processed which requests via one or more applications that the user tap, gesture, or otherwise indicate one or more times via the user's device. If the counter 104 increases in the appropriate sequence, then it possible to know that the user has done so.

The key diversification technique described herein with reference to the counter 104, master key 105, and diversified key 106 is one example of encryption and/or decryption a key diversification technique. This example key diversification technique should not be considered limiting of the disclosure, as the disclosure is equally applicable to other types of key diversification techniques. As a second example, two bank identifier number (BIN) level master keys may be used in conjunction with the account identifier and a card sequence number to produce two unique derived keys (UDKs) per contactless card 101. In some examples, a bank identifier number may comprise one number or a combination of one or more numbers, such as an account number or an unpredictable number provided by one or more servers, may be used for session key generation and/or diversification. The UDKs (AUTKEY and ENCKEY) may be stored on the contactless card 101 during the personalization process. In such an embodiment, two session keys may be created for each transaction from the UDKs, i.e., one session key from AUTKEY and one session key from ENCKEY. For the MAC key (i.e., the session key created from AUTKEY), the low order of two bytes of the OTP counter may be used for diversification. For the ENC key (i.e., the session key created from ENCKEY), the low order of two bytes at the start of the diversification data arrays may be used, and the full 4-byte counter may be used to fill in the higher order bytes. Continuing with the second example, the MAC key may be used for preparing the MAC cryptogram, and the ENC key can be used to encrypt the cryptogram. Doing so simplifies verification and processing of the MAC because 2-byte diversification is directly supported in the MAC authentication functions of payment HSMs 125. Decryption of the cryptogram is performed prior to verification of the MAC. The session keys are independently derived at the one or more servers, resulting in a first session key (the ENC session key) and a second session key (the MAC session key). The second derived key (i.e., the ENC session key) may be used to decrypt the data, and the first derived key (i.e., the MAC session key) may be used to verify the decrypted data.

Continuing with the second example, for the contactless card 101, a different unique identifier is derived which may be related to the application primary account number (PAN) and PAN sequence number, which is encoded in the card. The key diversification may be configured to receive the identifier as input with the master key such that one or more keys may be created for each contactless card. In some examples, these diversified keys may comprise a first key and a second key. The first key may include an authentication master key (Card Cryptogram Generation/Authentication Key—Card-Key-Auth). The second key may comprise an encryption master key (Card Data Encryption Key—Card-Key-DEK). The first and second keys may be used by the one or more applets 240 to generate session keys that may be used to generate a MAC cryptogram, authenticate the card, and to encipher it, respectively. In some examples, the first and the second keys may be created by diversifying the issuer master keys by combining them with the card's unique ID number (pUID) and the PAN sequence number (PSN) of a payment applet, as specified in EMV key diversion algorithm Option A of EMV 4.3 Book 2 A1.4 Master Key Derivation. The pUID may comprise a 16-digit numerical value. The pUID may comprise a 16-digit BCD encoded number. In some examples, pUID may comprise a 14-digit numerical value.

During the creation process of the contactless card 101, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card. By using the key diversification process, one or more keys may be derived from a master key based upon uniquely identifiable information for each entity that requires a key.

Regarding master key management, two issuer master keys may be required for each part of the portfolio on which the one or more applets is issued. For example, the first master key may comprise an Issuer Cryptogram Generation/Authentication Key (Iss-Key-Auth) and the second master key may comprise an Issuer Data Encryption Key (Iss-Key-DEK). In some examples, a network profile record ID (pNPR) and derivation key index (pDKI), as back office data, may be used to identify which Issuer Master Keys to use in the cryptographic processes for authentication. The system performing the authentication may be configured to retrieve values of pNPR and pDKI for a contactless card at the time of authentication.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. Regarding session key generation, the keys used to generate the cryptogram and encipher the data in the one or more applets may comprise session keys based on the card unique keys (Card-Key-Auth and Card-Key-Dek). The session keys (Sess-Key-Auth and Sess-Key-DEK) may be generated by the one or more applets and derived by using the application transaction counter (pATC) with one or more algorithms (as defined in EMV 4.3 Book 2 A1.3.1 Common Session Key Derivation). To fit data into the one or more algorithms, only the 2 low order bytes of the 4-byte pATC is used. In some examples, the four byte session key derivation method may comprise: F1:=PATC(lower 2 bytes) ||'F0' ||'00'||PATC (four bytes) F1:=PATC(lower 2 bytes) ||'0F'||'00'||PATC (four bytes) SK:={(ALG (MK) [F1])||ALG (MK) [F2]}, where ALG may include 3DES ECB and MK may include the card unique derived master key.

As described herein, one or more MAC session keys may be derived using the lower two bytes of pATC counter. The pATC may be initialized to zero at personalization or applet initialization time. In some examples, the pATC counter may be initialized at or before personalization, and may be configured to increment by one at each NDEF read. In some examples, data may be stored in the contactless card 101 at personalization time by implementing STORE DATA (E2) under secure channel protocol 2. One or more values may be read by the personalization bureau from the EMBOSS files (in a section designated by the Applet ID) and one or more store data commands may be transmitted to the contactless card after authentication and secure channel establishment.

Further, the increment for each card may be unique, and assigned either by personalization, or algorithmically assigned by pUID or other identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and must be exactly one block long. The MAC may be performed by a function key (AUT_Session). The data specified in cryptogram may be processed with javacard.signature method: ALG_DES_MAC8_ISO9797_1_M2_ALG3 to correlate to EMV ARQC verification methods. The key used for this computation may comprise a session key. As stated, the low order two bytes of the counter may be used to diversify for the one or more MAC session keys. In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key derived from the DEKKey. In this case, the ATC value for the session key derivation is the least significant byte of the counter pATC.

The format below represents a binary version example embodiment. Further, in some examples, the first byte may be set to ASCII 'A'.

| Message Format | | | | |
|---|---|---|---|---|
| 1 | 2 | 4 | 8 | 8 |
| 0x43 (Message Type 'A') | Version | pATC | RND | Cryptogram A (MAC) |
| Cryptogram A (MAC) | 8 bytes | | | |
| MAC of | | | | |
| 2 Version | 8 pUID | 4 pATC | 4 Shared Secret | 18 bytes input data |

| Message Format | | | | |
|---|---|---|---|---|
| 1 | 2 | 4 | | 16 |
| 0x43 (Message Type 'A') | Version | pATC | | Cryptogram B |
| Cryptogram A (MAC) | 8 bytes | | | |
| MAC of | | | | |
| 2 | 8 | 4 | 4 | 18 bytes input data |
| Version | pUID | pATC | Shared Secret | |
| Cryptogram B | 16 | | | |
| Sym Encryption of | | | | |
| 8 | 8 | | | |
| RND | Cryptogram A | | | |

Another exemplary format is shown below. In this 20 example, the tag may be encoded in hexadecimal format.

| Message Format | | | | |
|---|---|---|---|---|
| 2 | 8 | 4 | 8 | 8 |
| Version | pUID | pATC | RND | Cryptogram A (MAC) |
| 8 bytes | | | | |
| 8 | 8 | 4 | 4 | 18 bytes input data |
| pUID | pUID | pATC | Shared Secret | |

| Message Format | | | | |
|---|---|---|---|---|
| 2 | 8 | 4 | | 16 |
| Version | pUID | pATC | | Cryptogram B |
| 8 bytes | | | | |
| 8 | 8 | 4 | 4 | 18 bytes input data |
| pUID | pUID | pATC | Shared Secret | |
| Cryptogram B | 16 | | | |
| Sym Encryption of | | | | |
| 8 | 8 | | | |
| RND | Cryptogram A | | | |

The UID field of the received message may be extracted to derive, from master keys Iss-Key-AUTH and Iss-Key-DEK, the card master keys (Card-Key-Auth and Card-Key-DEK) for that particular card. Using the card master keys (Card-Key-Auth and Card-Key-DEK), the counter (pATC) field of the received message may be used to derive the session keys (Aut-Session-Key and DEK-Session-Key) for that particular card. Cryptogram B may be decrypted using the DEK-Session-KEY, which yields cryptogram A and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key. The input data may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the next MAC operation, data is processed through the MAC using Aut-Session-Key to produce MAC output (cryptogram A), which is encrypted.

In order to provide additional protection against brute force attacks exposing the keys on the card, it is desirable that the MAC cryptogram be enciphered. In some examples, data or cryptogram A to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key. In the next encryption operation, data or cryptogram A and RND are processed using DEK-Session-Key to produce encrypted data, cryptogram B. The data may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

Figure 3:
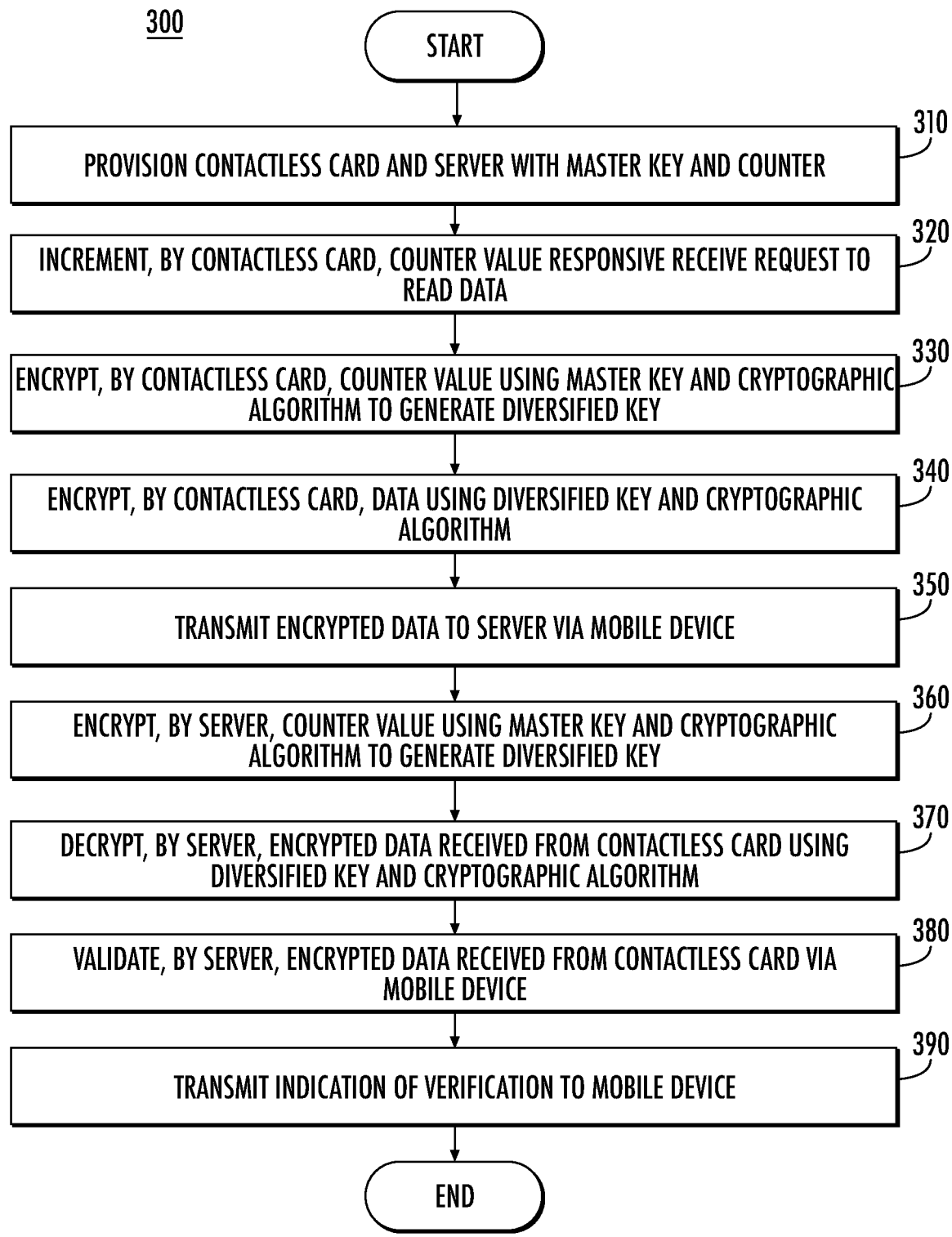
FIG. 3 illustrates an embodiment of a first logic flow.

FIG. 3 illustrates an embodiment of a logic flow 300. The logic flow 300 may be representative of some or all of the operations executed by one or more embodiments described herein. For example, the logic flow 300 may include some or all of the operations to provide key diversification. Embodiments are not limited in this context.

As shown, the logic flow 300 begins at block 310, where the contactless card 101 and the server 120 are provisioned with the same master key 105. At block 320, the contactless card 101 increments the counter value 104 in the memory 102 responsive to receiving a request to read data. For example, the account application 113 of mobile device 110 may generate the request to read data from the contactless card 101 as part of a verification process during an NFC-based currency transfer. At block 330, the contactless card 101 generates the diversified key 106 using the counter value 104 and the master key 105 in the memory 102 and a cryptographic algorithm. At block 340, the contactless card 101 encrypts data (e.g., the customer identifier 107) using the diversified key 106 and the cryptographic algorithm, generating encrypted data.

At block 350, the contactless card 101 may transmit the encrypted data to the account application 113 of the requesting mobile device 110 using NFC. In at least one embodiment, the contactless card 101 further includes an indication of the counter value 104 along with the encrypted data. At block 360, the account application 113 of the mobile device 110 may transmit the data received from the contactless card 101 to the management application 123 of the server 120. At block 360, the management application 123 of the server 120 may generate a diversified key 106 using the master key 105 and the counter value 104 as input to a cryptographic algorithm. In one embodiment, the management application 123 uses the counter value 104 provided by the contactless card 101. In another embodiment, the management application 123 increments the counter value 104 in the memory 122 to synchronize the state of the counter value 104 in the memory 122 with the counter value 104 in the memory 102 of the contactless card 101.

At block 370, the management application 123 decrypts the encrypted data received from the contactless card 101 via the mobile device 110 using the diversified key 106 and a cryptographic algorithm. Doing so may yield at least the customer identifier 107. By yielding the customer identifier 107, the management application 123 may validate the data received from the contactless card 101 at block 380. For example, the management application 123 may compare the customer identifier 107 to a customer identifier for the associated account in the account data 124, and validate the data based on a match. At block 390, the management application 123 may transmit an indication of the validation (e.g., validation success) to the account application 113 of the mobile device 110.

Figure 4:
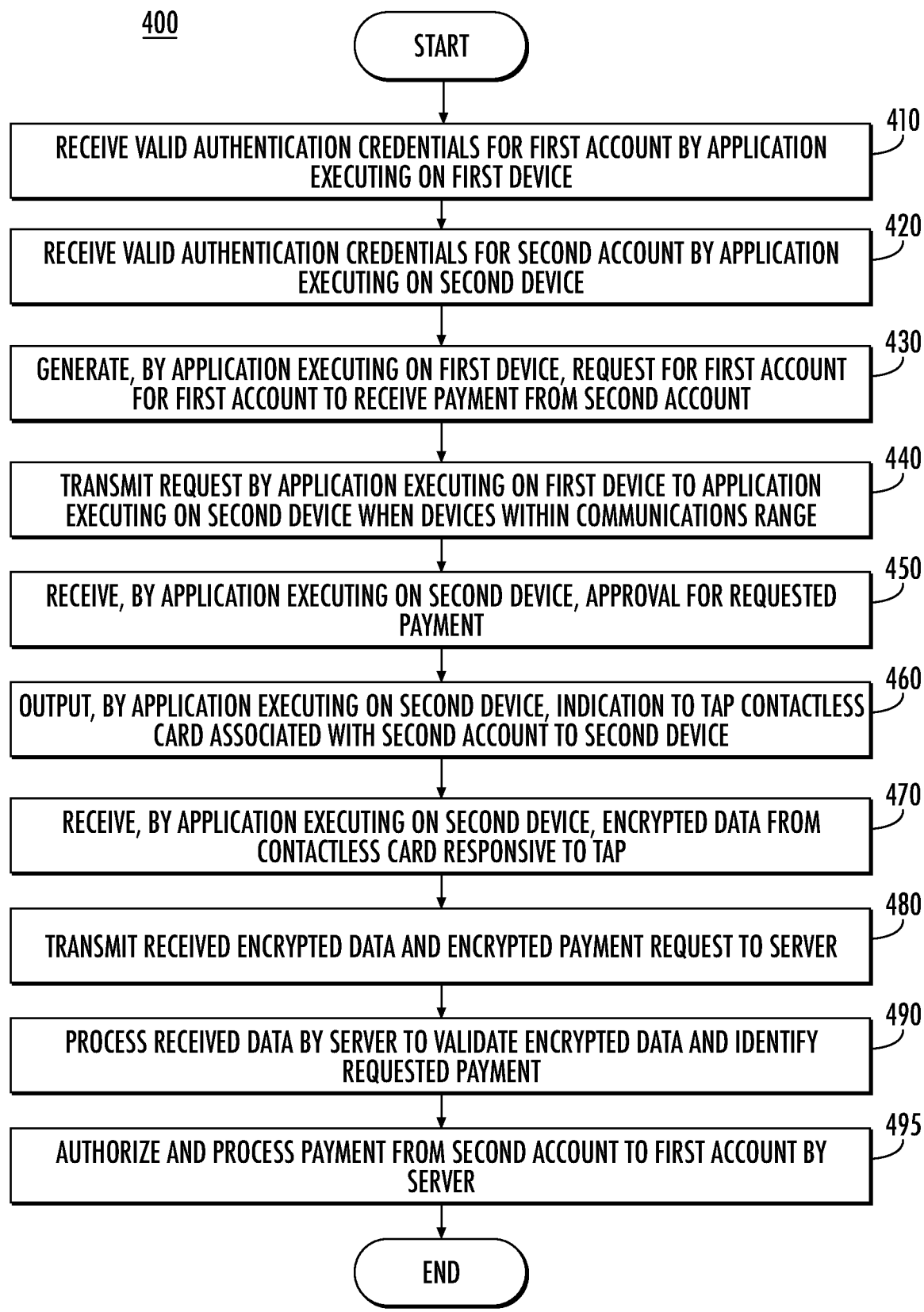
FIG. 4 illustrates an embodiment of a second logic flow.

FIG. 4 illustrates an embodiment of a logic flow 400. The logic flow 400 may be representative of some or all of the operations executed by one or more embodiments described herein. For example, the logic flow 400 may include some or all of the operations to process a currency transfer using a first mobile device 110-1 and a second mobile device 110-2. Embodiments are not limited in this context.

As shown, the logic flow 400 begins at block 410, where the account application 113 of the first mobile device 110-1 receives valid authentication credentials for a first user account. As stated, the authentication credentials may include a username/password combination, biometric credentials, or any other type of authentication credentials. At block 420, the account application 113 of the second mobile device 110 receives valid authentication credentials for a second user account. At block 430, the account application 113 of the first mobile device 110-1 generates a request to receive payment from the second account associated with the second mobile device 110-1. For example, the first user may provide input to the account application 113 of the mobile device 110-1 specifying to receive a specified sum (e.g., $50) from the second account of the second user.

At block 440, the account application 113 of the first mobile device 110-1 transmits the request to the account application 113 of the second mobile device 110-2 when the devices are within NFC communications range. The account application 113 of the second mobile device 110-2 may then output an indication of the requested payment to the second user. At block 450, the account application 113 of the second mobile device 110-2 receives input from the second user approving the requested payment. At block 460, the account application 113 of the second mobile device 110-2 outputs an indication specifying to tap the contactless card 101 associated with the second account to the second mobile device 110-2. At block 470, the contactless card 101 associated with the second account is tapped to the mobile device 110-2. Doing so causes the contactless card 101 to generate encrypted data (e.g., an encrypted customer identifier 107) using the master key 105, counter value 104, and diversified key 106 as described above (e.g., blocks 320-350 of logic flow 300). The contactless card 101 may then transmit the data (which may include the counter value 104) to the account application 113 of the second mobile device 110-2.

At block 480, the account application 113 of the second mobile device 110-2 transmits the data received from the contactless card 101 to the management application 123 of the server 120. The account application 113 may further transmit, to the management application 123 of server 120, an indication of the requested payment of funds from the second account to the first account. At block 490, the management application 123 of the server 120 processes the received data to validate the data generated by the contactless card 101 using key diversification (e.g., as described in blocks 360-390 of the logic flow 300). The management application 123 of the server 120 may further identify the indication of the requested payment, which may be processed once the server validates the data generated by the contactless card 101. At block 495, the management application 123 of the server 120 authorizes the requested payment and processes the payment of funds from the first account to the second account.

Figure 5:
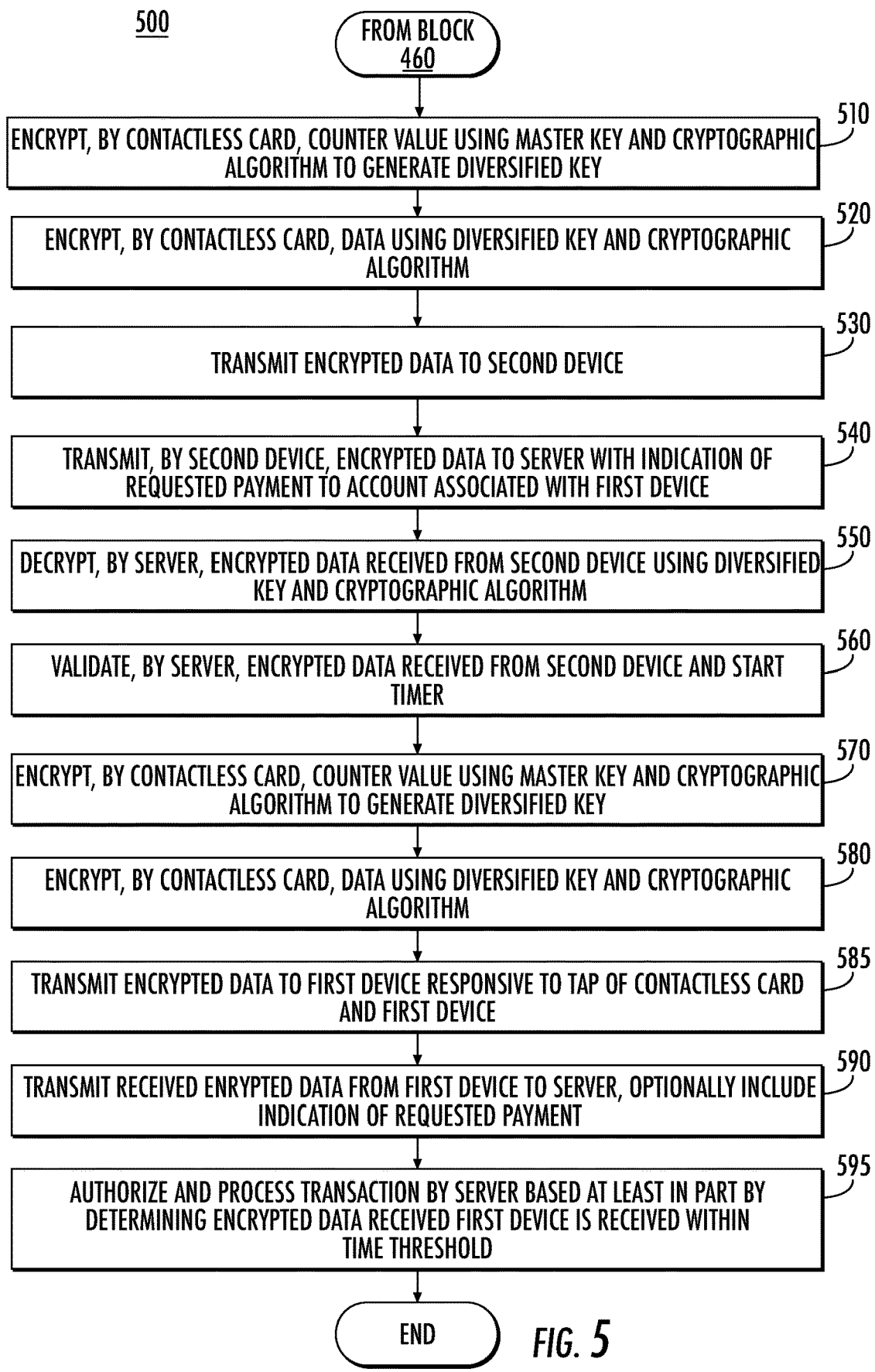
FIG. 5 illustrates an embodiment of a third logic flow.

FIG. 5 illustrates an embodiment of a logic flow 500. The logic flow 500 may be representative of some or all of the operations executed by one or more embodiments described herein. For example, the logic flow 500 may include some or all of the operations to process a currency transfer using a first mobile device 110-1 and a second mobile device 110-2. Embodiments are not limited in this context.

As shown, the logic flow 500 may commence from block 460 of FIG. 4. More generally, the logic flow 500 may commence subsequent to the first and second users providing input via the account applications 113 of the first and second mobile devices 110-1 and 110-2 to process an NFC-based payment from the second account of the second user to the first account of the first user. The account application 113 of the second mobile device 110-2 then outputs the indication to tap the contactless card 101 to the second mobile device 110-2.

At block 510, the contactless card 101 generates the diversified key 106 using the counter value 104 and the master key 105 in the memory 102 and a cryptographic algorithm. As stated, the contactless card 101 may increment the counter value 104 prior to generating the diversified key 106, e.g., after receiving the read data request from the account application 113 of the second mobile device 110-2. At block 520, the contactless card 101 encrypts data (e.g., the customer identifier 107) using the diversified key 106 and the cryptographic algorithm, generating encrypted data. At block 530, the contactless card 101 transmits the encrypted data generated at block 520 to the account application 113 of the second mobile device 110-2. As stated, the contactless card 101 may further transmit the current counter value 104 to the account application 113 of the second mobile device 110-2.

At block 540, the account application 113 of the second mobile device 110-2 transmits the data received from the contactless card 101 at block 530 to the management application 123 of the server 120. At block 550, the management application 123 of the server 120 decrypts the received encrypted data using the master key 105, diversified key 106, counter value 104, and a cryptographic algorithm. As stated, the management application 123 of the server 120 may generate the diversified key 106 using the counter value 104, master key 105, and the cryptographic algorithm. In one embodiment, the counter value 104 is received from the contactless card 101. In other embodiments, the management application 123 of the server 120 increments the counter 104 in the memory 122 to generate the diversified key 106. At block 560, the management application 123 of the server 120 may validate the data received from the contactless card 101 via the mobile device 110-2 by matching the decrypted customer identifier 107 with a customer identifier of the user stored in the account data 124. The management application 123 of the server 120 may further start a timer at block 560. The timer is set to track an amount of time for receiving data from the contactless card 101 via a tap with the mobile device 110-1 to validate the payment.

At block 570, the contactless card 101 generates the diversified key 106 using the counter value 104 and the master key 105 in the memory 102 as input to a cryptographic algorithm. As stated, the contactless card 101 may increment the counter value 104 prior to generating the diversified key 106, e.g., after receiving a request to read data from the account application 113 of the first mobile device 110-1. At block 580, the contactless card 101 encrypts data (e.g., the customer identifier 107) using the diversified key 106 and the cryptographic algorithm, generating encrypted data. At block 585, the contactless card 101 transmits the encrypted data generated at block 580 to the account application 113 of the first mobile device 110-1 based on a tap of the contactless card 101 and the first mobile device 110-1. As stated, the contactless card 101 may further transmit the current counter value 104 to the account application 113 of the first mobile device 110-1. At block 590, the account application 113 of the first mobile device 110-1 transmits the data received from the contactless card 101 at block 585 to the management application 123 of the server 120. The account application 113 of the first mobile device 110-1 may further include an indication of the requested payment from the second account to the first account.

At block 595, the management application 123 of the server 120 authorizes the requested transaction based at least in part on the time that has elapsed between starting the timer at block 560 and receiving the data at block 590. If the elapsed time exceeds a threshold amount of time (e.g., 1 minute, 30 seconds, etc.), the management application 123 of the server 120 rejects the request to process the transaction. If the elapsed time does not exceed the threshold amount of time, the management application 123 of the server 120 authorizes the requested payment. The management application 123 of the server 120 may further decrypt the data received at block 585 using key diversification as described above. However, the decrypted customer identifier 107 will not match the customer identifier of the account logged into the account application 110 of the first device 110-1 (e.g., the identifier of the first account), as the customer identifier 107 transmitted by the contactless card 101 corresponds to the account of the second customer. However, even though the validation does not succeed in this step, the management application 123 of the server 120 validates the transaction based on the validation at block 560 and receiving the data from the contactless card 101 via the first mobile device 110-1 within the threshold amount of time. Further still, the management application 123 of the server 120 may identify the customer identifier 107 of the second account, and authorize the transaction based on the customer identifier 107 of the second account being a party to the requested payment transaction. Regardless of the verification techniques used, the management application 123 of the server 120 may then process the transfer of funds from the second account to the first account.

In some examples, the contactless card 101 may be tapped to a device, such as one or more computer kiosks or terminals, to verify identity so as to receive a transactional item responsive to a purchase, such as a coffee. By using the contactless card 101, a secure method of proving identity in a loyalty program may be established. Securely proving the identity, for example, to obtain a reward, coupon, offer, or the like or receipt of a benefit is established in a manner that is different than merely scanning a bar card. For example, an encrypted transaction may occur between the contactless card 101 and the device, which may configured to process one or more tap gestures. As explained above, the one or more applications may be configured to validate identity of the user and then cause the user to act or respond to it, for example, via one or more tap gestures. In some examples, data for example, bonus points, loyalty points, reward points, healthcare information, etc., may be written back to the contactless card.

In some examples, the contactless card 101 may be tapped to a device, such as the mobile device 110. As explained above, identity of the user may be verified by the one or more applications which would then grant the user a desired benefit based on verification of the identity.

In some embodiments, an example authentication communication protocol may mimic an offline dynamic data authentication protocol of the EMV standard that is commonly performed between a transaction card and a point-of-sale device, with some modifications. For example, because the example authentication protocol is not used to complete a payment transaction with a card issuer/payment processor per se, some data values are not needed, and authentication may be performed without involving real-time online connectivity to the card issuer/payment processor. As is known in the art, point of sale (POS) systems submit transactions including a transaction value to a card issuer. Whether the issuer approves or denies the transaction may be based on if the card issuer recognizes the transaction value. Meanwhile, in certain embodiments of the present disclosure, transactions originating from a mobile device lack the transaction value associated with the POS systems. Therefore, in some embodiments, a dummy transaction value (i.e., a value recognizable to the card issuer and sufficient to allow activation to occur) may be passed as part of the example authentication communication protocol. POS based transactions may also decline transactions based on the number of transaction attempts (e.g., transaction counter). A number of attempts beyond a buffer value may result in a soft decline; the soft decline requiring further verification before accepting the transaction. In some implementations, a buffer value for the transaction counter may be modified to avoid declining legitimate transactions.

In some examples, the contactless card 101 can selectively communicate information depending upon the recipient device. Once tapped, the contactless card 101 can recognize the device to which the tap is directed, and based on this recognition the contactless card can provide appropriate data for that device. This advantageously allows the contactless card to transmit only the information required to complete the instant action or transaction, such as a payment or card authentication. By limiting the transmission of data and avoiding the transmission of unnecessary data, both efficiency and data security can be improved. The recognition and selective communication of information can be applied to a various scenarios, including card activation, balance transfers, account access attempts, commercial transactions, and step-up fraud reduction.

If the tap of the contactless card 101 is directed to a device running Apple's iOS® operating system, e.g., an iPhone, iPod, or iPad, the contactless card can recognize the iOS® operating system and transmit data appropriate data to communicate with this device. For example, the contactless card 101 can provide the encrypted identity information necessary to authenticate the card using NDEF tags via, e.g., NFC. Similarly, if the contactless card tap is directed to a device running the Android® operating system, e.g., an Android® smartphone or tablet, the contactless card can recognize the Android® operating system and transmit appropriate and data to communicate with this device (such as the encrypted identity information necessary for authentication by the methods described herein).

As another example, the contactless card tap can be directed to a POS device, including without limitation a kiosk, a checkout register, a payment station, or other terminal. Upon performance of the tap, the contactless card 101 can recognize the POS device and transmit only the information necessary for the action or transaction. For example, upon recognition of a POS device used to complete a commercial transaction, the contactless card 101 can communicate payment information necessary to complete the transaction under the EMV standard.

In some examples, the POS devices participating in the transaction can require or specify additional information, e.g., device-specific information, location-specific information, and transaction-specific information, that is to be provided by the contactless card. For example, once the POS device receives a data communication from the contactless card, the POS device can recognize the contactless card and request the additional information necessary to complete an action or transaction.

In some examples the POS device can be affiliated with an authorized merchant or other entity familiar with certain contactless cards or accustomed to performing certain contactless card transactions. However, it is understood such an affiliation is not required for the performance of the described methods.

In some examples, such as a shopping store, grocery store, convenience store, or the like, the contactless card 101 may be tapped to a mobile device without having to open an application, to indicate a desire or intent to utilize one or more of reward points, loyalty points, coupons, offers, or the like to cover one or more purchases. Thus, an intention behind the purchase is provided.

In some examples, the one or more applications may be configured to determine that it was launched via one or more tap gestures of the contactless card 101, such that a launch occurred at 3:51 pm, that a transaction was processed or took place at 3:56 pm, in order to verify identity of the user.

In some examples, the one or more applications may be configured to control one or more actions responsive to the one or more tap gestures. For example, the one or more actions may comprise collecting rewards, collecting points, determine the most important purchase, determine the least costly purchase, and/or reconfigure, in real-time, to another action.

In some examples, data may be collected on tap behaviors as biometric/gestural authentication. For example, a unique identifier that is cryptographically secure and not susceptible to interception may be transmitted to one or more backend services. The unique identifier may be configured to look up secondary information about individual. The secondary information may comprise personally identifiable information about the user. In some examples, the secondary information may be stored within the contactless card.

In some examples, the device may comprise an application that splits bills or check for payment amongst a plurality of individuals. For example, each individual may possess a contactless card, and may be customers of the same issuing financial institution, but it is not necessary. Each of these individuals may receive a push notification on their device, via the application, to split the purchase. Rather than accepting only one card tap to indicate payment, other contactless cards may be used. In some examples, individuals who have different financial institutions may possess contactless cards 101 to provide information to initiate one or more payment requests from the card-tapping individual.

In some examples, the present disclosure refers to a tap of the contactless card. However, it is understood that the present disclosure is not limited to a tap, and that the present disclosure includes other gestures (e.g., a wave or other movement of the card).

Figure 6:
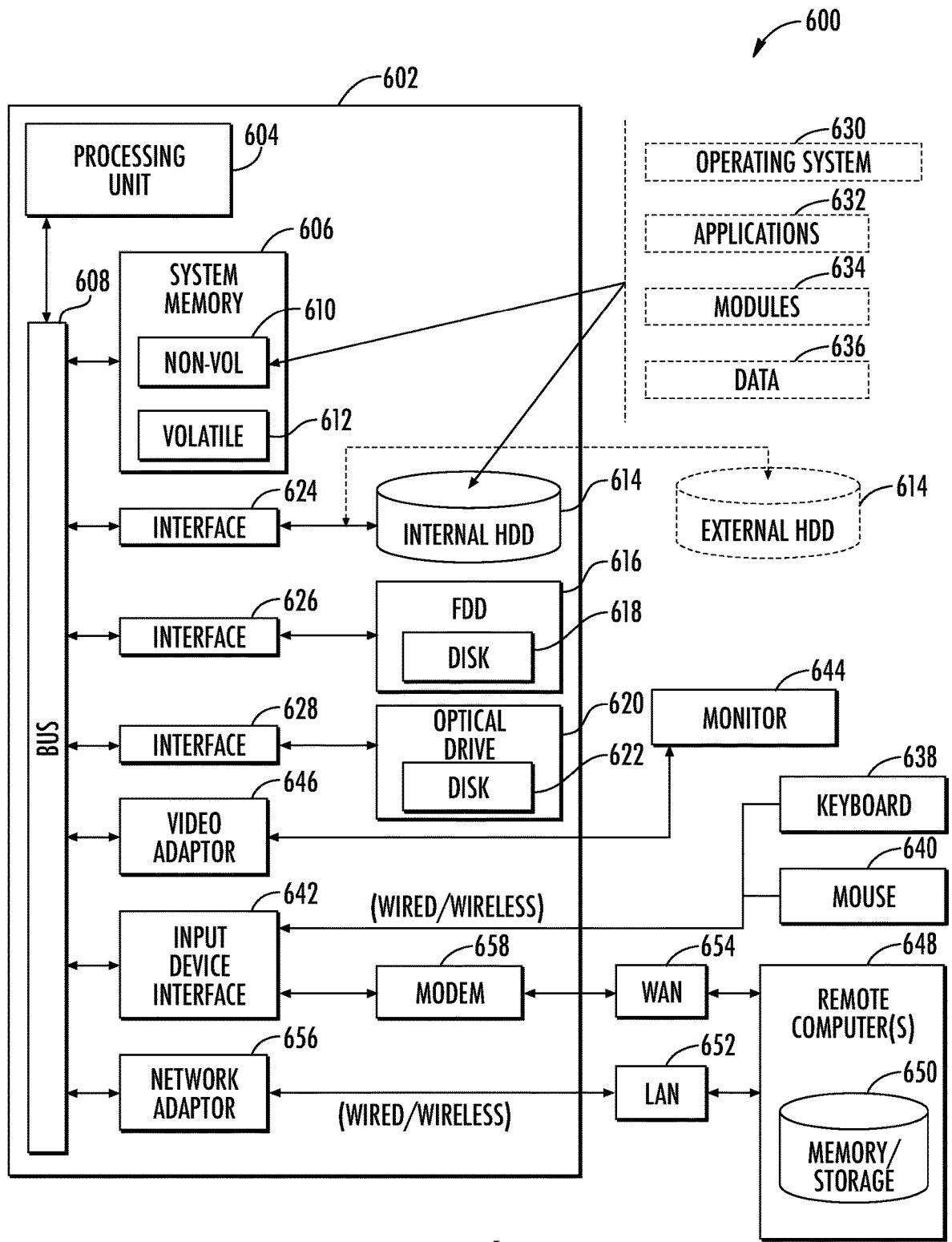
FIG. 6 illustrates an embodiment of a computing architecture.

FIG. 6 illustrates an embodiment of an exemplary computing architecture 600 comprising a computing system 602 that may be suitable for implementing various embodiments as previously described. In various embodiments, the computing architecture 600 may comprise or be implemented as part of an electronic device. In some embodiments, the computing architecture 600 may be representative, for example, of a system that implements one or more components of the system 100. In some embodiments, computing system 602 may be representative, for example, of the mobile devices 110 and server 120 of the system 100. The embodiments are not limited in this context. More generally, the computing architecture 600 is configured to implement all logic, applications, systems, methods, apparatuses, and functionality described herein with reference to FIGS. 1-5.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 602 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 602.

As shown in FIG. 6, the computing system 602 comprises a processor 604, a system memory 606 and a system bus 608. The processor 604 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 604.

The system bus 608 provides an interface for system components including, but not limited to, the system memory 606 to the processor 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computing system 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies. The computing system 602 is generally is configured to implement all logic, systems, methods, apparatuses, and functionality described herein with reference to FIGS. 1-5.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 100, e.g., the account application 110 and management application 123.

A user can enter commands and information into the computing system 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computing system 602. In addition to the monitor 644, a computer typically includes other peripheral output devices, such as speakers, printers, and so forth.

The computing system 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computing system 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 652 and the WAN 654.

When used in a LAN networking environment, the computing system 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computing system 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computing system 602, or portions thereof, can be stored in the remote memory/storage device 650. It will be appreciated that the network connections shown are exemplary and other means of establishing a communications link between the computers can be used.

The computing system 602 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A computer-implemented method, comprising:
receiving, by a server, a first cryptogram from an application executing on a first device, the first cryptogram generated by a contactless card associated with a first account;
incrementing, by the server, a counter value associated with the contactless card to generate a first counter value;
generating, by the server, a first diversified key based on encrypting a master key of the contactless card and the first counter value of the contactless card;
verifying, by the server, the first cryptogram based at least in part on decrypting the first cryptogram using the first diversified key;
receiving, by the server from the application, a request to transfer funds from the first account to a second account, the second account associated with a second device;
receiving, by the server, a second cryptogram from an application executing on the second device, the second cryptogram generated by the contactless card;
incrementing, by the server, the first counter value to generate a second counter value associated with the contactless card;
generating, by the server, a second diversified key based on encrypting the master key and the second counter value;
verifying, by the server, the second cryptogram based at least in part on decrypting the second cryptogram using the second diversified key;
determining, by the server, that the second cryptogram is received within a threshold amount of time of receiving the first cryptogram; and
authorizing, by the server, the request to transfer funds from the first account to the second account based on the verification of the first and second cryptograms and the determination that the second cryptogram is received within the threshold amount of time of receiving the first cryptogram.

2. The method of claim 1, further comprising:
receiving, by the server from the application executing on the first device, an indication that the first account has been authenticated based on received input comprising one or more of a username and a password for the first account, or biometric credentials for the first account; and
receiving, by the server from the application executing on the second device, an indication that the second account has been authenticated based on received input comprising one or more of a username and a password for the second account, or biometric credentials for the second account.

3. The method of claim 1, the first and second cryptograms comprising message authentication code (MAC) cryptograms, the method further comprising:
processing, by the server, the request to transfer funds from the first account to the second account.

4. The method of claim 1, further comprising:
starting a timer by the server responsive to receiving the first cryptogram from the first device, wherein the server determines that the second cryptogram is received from the second device within the threshold amount of time of receiving the first cryptogram from the first device based on the timer.

5. The method of claim 1, wherein verifying the first cryptogram comprises determining that a customer identifier yielded by decrypting the first cryptogram matches a customer identifier associated with the first account, wherein verifying the second cryptogram comprises determining that a customer identifier yielded by decrypting the second cryptogram matches the customer identifier associated with the first account.

6. The method of claim 5, wherein the first cryptogram is encrypted by the contactless card based on the first diversified key, wherein the second cryptogram is encrypted by the contactless card based on the second diversified key.

7. The method of claim 6, wherein the first and second counter values are synchronized between the contactless card and the server.

8. A non-transitory computer-readable storage medium having computer-readable program code embodied therewith, the computer-readable program code executable by a processor of a server to cause the processor to:
   receive a first cryptogram from an application executing on a first device, the first cryptogram generated by a contactless card associated with a first account;
   increment a counter value associated with the contactless card to generate a first counter value;
   generate a first diversified key based on encrypting a master key of the contactless card and the first counter value of the contactless card;
   verify the first cryptogram based at least in part on decrypting the first cryptogram using the first diversified key;
   receive, from the application, a request to transfer funds from the first account to a second account, the second account associated with a second device;
   receive a second cryptogram from an application executing on the second device, the second cryptogram generated by the contactless card;
   increment the first counter value to generate a second counter value associated with the contactless card;
   generate a second diversified key based on encrypting the master key and the second counter value;
   verify the second cryptogram based at least in part on decrypting the second cryptogram using the second diversified key;
   determine that the second cryptogram is received within a threshold amount of time of receiving the first cryptogram; and
   authorize the request to transfer funds from the first account to the second account based on the verification of the first and second cryptograms and the determination that the second cryptogram is received within the threshold amount of time of receiving the first cryptogram.

9. The medium of claim 8, the computer-readable program code executable by the processor to cause the processor to:
   receive, from the application executing on the first device, an indication that the first account has been authenticated based on received input comprising one or more of a username and a password for the first account, or biometric credentials for the first account; and
   receive, from the application executing on the second device, an indication that the second account has been authenticated based on received input comprising one or more of a username and a password for the second account, or biometric credentials for the second account.

10. The medium of claim 8, the first and second cryptograms comprising message authentication code (MAC) cryptograms, the computer-readable program code executable by the processor to cause the processor to:
    process the request to transfer funds from the first account to the second account.

11. The medium of claim 8, the computer-readable program code executable by the processor to cause the processor to:
    start a timer responsive to receiving the first cryptogram from the first device, wherein the determination that the second cryptogram is received from the second device within the threshold amount of time of receiving the first cryptogram from the first device is based on the timer.

12. The medium of claim 8, the computer-readable program code to verify the first and second cryptograms executable by the processor to cause the processor to:
    determine that a customer identifier yielded by decrypting the first cryptogram matches a customer identifier associated with the first account to verify the first cryptogram; and
    determine that a customer identifier yielded by decrypting the second cryptogram matches the customer identifier associated with the first account to verify the second cryptogram.

13. The medium of claim 12, wherein the first cryptogram is encrypted by the contactless card based on the first diversified key, wherein the second cryptogram is encrypted by the contactless card based on the second diversified key.

14. The medium of claim 13, wherein the first and second counter values are synchronized between the contactless card and the server.

15. A system, comprising:
    a processor; and
    a memory storing instructions that when executed by the processor cause the processor to:
      receive a first cryptogram from an application executing on a first device, the first cryptogram generated by a contactless card associated with a first account;
      increment a counter value associated with the contactless card to generate a first counter value;
      generate a first diversified key based on encrypting a master key of the contactless card and the first counter value of the contactless card;
      verify the first cryptogram based at least in part on decrypting the first cryptogram using the first diversified key;
      receive, from the application, a request to transfer funds from the first account to a second account, the second account associated with a second device;
      receive a second cryptogram from an application executing on the second device, the second cryptogram generated by the contactless card;
      increment the first counter value to generate a second counter value associated with the contactless card;
      generate a second diversified key based on encrypting the master key and the second counter value;
      verify the second cryptogram based at least in part on decrypting the second cryptogram using the second diversified key;
      determine that the second cryptogram is received within a threshold amount of time of receiving the first cryptogram; and
      authorize the request to transfer funds from the first account to the second account based on the verification of the first and second cryptograms and the determination that the second cryptogram is received within the threshold amount of time of receiving the first cryptogram.

16. The system of claim 15, the memory storing instructions that when executed by the processor cause the processor to:

receive, from the application executing on the first device, an indication that the first account has been authenticated based on received input comprising one or more of a username and a password for the first account, or biometric credentials for the first account; and receive, from the application executing on the second device, an indication that the second account has been authenticated based on received input comprising one or more of a username and a password for the second account, or biometric credentials for the second account.

17. The system of claim 15, the first and second cryptograms comprising message authentication code (MAC) cryptograms, the memory storing instructions that when executed by the processor cause the processor to:

process the request to transfer funds from the first account to the second account.

18. The system of claim 15, the instructions to verify the first and second cryptograms to comprise instructions that when executed by the processor cause the processor to:

determine that a customer identifier yielded by decrypting the first cryptogram matches a customer identifier associated with the first account to verify the first cryptogram; and determine that a customer identifier yielded by decrypting the second cryptogram matches the customer identifier associated with the first account to verify the second cryptogram.

19. The system of claim 18, wherein the first cryptogram is encrypted by the contactless card based on the first diversified key, wherein the second cryptogram is encrypted by the contactless card based on the second diversified key.

20. The system of claim 19, wherein the first and second counter values are synchronized between the contactless card and the system.

* * * * *